United States Patent [19]

Targetti

[11] Patent Number: 4,859,109

[45] Date of Patent: Aug. 22, 1989

[54] EXPANSION TYPE CLAMP FOR CONNECTING COINCIDING ENDS OF TUBULAR COMPONENTS FOR RETICULAR STRUCTURES AND THE LIKE

[76] Inventor: Giampaolo Targetti, Via Barbacane No. 29, 50133 Firenze, Italy

[21] Appl. No.: 81,119

[22] Filed: Aug. 3, 1987

[30] Foreign Application Priority Data

Aug. 5, 1986 [IT] Italy ................. 11774/86[U]

[51] Int. Cl.$^4$ ............................................. F16B 7/04
[52] U.S. Cl. ..................................... 403/297; 403/362
[58] Field of Search ............... 403/297, 292, 314, 372, 403/295, 289, 290, 328, 108, 362

[56] References Cited

U.S. PATENT DOCUMENTS

| | | | |
|---|---|---|---|
| 1,678,350 | 7/1928 | Ott | 403/297 X |
| 2,290,430 | 7/1942 | Heiser | 403/297 |
| 2,473,388 | 6/1949 | Rambo | 403/292 |
| 3,484,830 | 12/1969 | Wagner et al. | 403/297 X |
| 3,545,625 | 12/1970 | MacMillan | 403/297 X |
| 3,753,583 | 8/1973 | Offenbroich | 403/297 |
| 4,181,230 | 1/1980 | Acuff | 403/108 X |
| 4,556,337 | 12/1985 | Marshall | 403/297 X |
| 4,657,426 | 4/1987 | Targetti | 403/247 |
| 4,671,478 | 6/1987 | Schoenig et al. | 403/297 X |

FOREIGN PATENT DOCUMENTS

| | | | |
|---|---|---|---|
| 2468022 | 5/1981 | France | 403/289 |
| 0037305 | 3/1977 | Japan | 403/292 |
| 560850 | 4/1975 | Switzerland | 403/292 |

Primary Examiner—Peter M. Cuomo
Attorney, Agent, or Firm—Hopgood, Calimafde, Halil, Blaustein & Judlowe

[57] ABSTRACT

A clamp for joining hollow tubular members in end-to-end abutting relationship has two stiff elements shaped in correspondence to opposed inner wall surface of the end cavities of the tubular members and is provided with both elastic shims and a threaded screw for urging mutual separation between the elements. One of the elements has two truncated right circular cylindrical pegs projecting from its surface for entering corresponding holes in the walls of the tubular members. The threaded screw has a conical tip that enters a conical concavity in the opposite element to lock the elements against relative longitudinal movement when expanded within the tubular members.

1 Claim, 1 Drawing Sheet

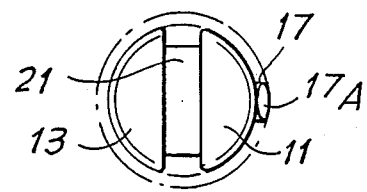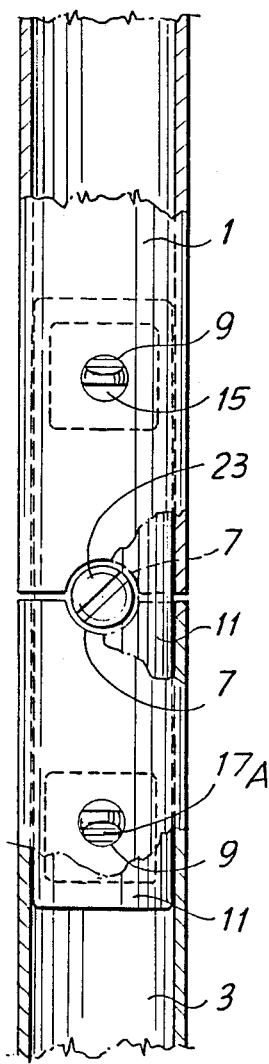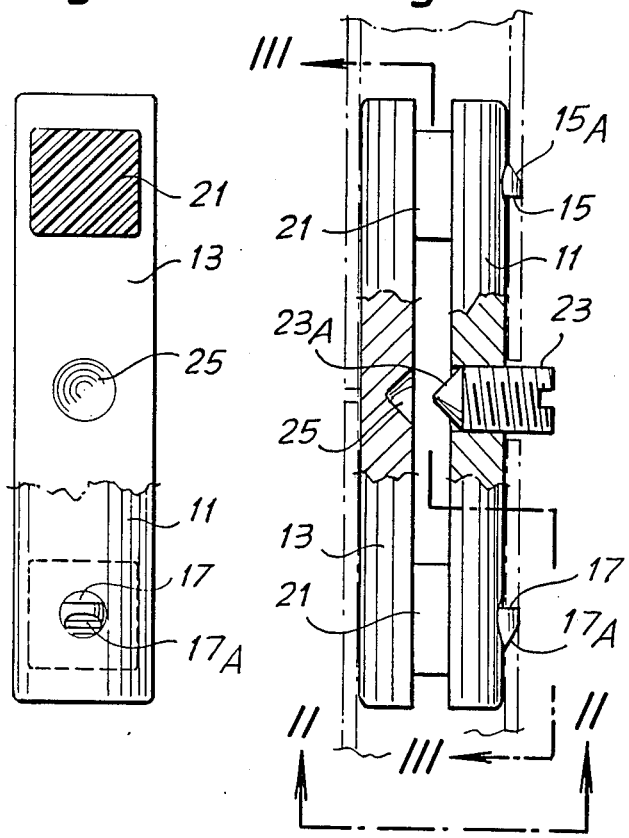

EXPANSION TYPE CLAMP FOR CONNECTING COINCIDING ENDS OF TUBULAR COMPONENTS FOR RETICULAR STRUCTURES AND THE LIKE

BACKGROUND OF THE INVENTION

The present invention relates to an improved clamp for joining abutting and coinciding ends of hollow tubular components for reticular structures and the like. The clamp is suitable for assuring a very stable connection and also a continuity of the abutting components without any particular prominence but with a practically uniform development of the connection between the two components, the clamp being particularly simple in its structure and Practical and fast in use.

In my U.S. Pat. No. 4,657,426, issued Apr. 14, 1987, entitled "EXPANSION CLAMP FOR THE CONNECTION OF COINCIDING ENDS OF HOLLOW COMPONENTS OF RETICULAR STRUCTURES AND THE LIKE" there is described and claimed a device for interconnecting the ends of hollow components, the device including at least two stiff elements shaped in correspondence with opposed portions of the inner wall surfaces of the components to be connected, elastic means interposed between the stiff elements to cause resilient separation therebetween, connecting means on the elements for engaging the components to be connected to secure against axial separation, and means for assuring a rigid arrangement of maximum separation between the two elements after installation inside the abutting components.

As disclosed in my said patent, the connecting means were in the form of right circular cylindrical bosses or stakes protruding from both of the elements near both ends thereof and arranged to be received in holes through the walls of the tubular components being joined. The stakes were taller than the wall thickness of the component so as to protrude above the radially outer surface of the connected components when installed therein. Additionally, as contemplated in said patent, the elements of the device had squared off ends.

SUMMARY OF THE INVENTION

While the device disclosed and claimed in my aforesaid patent works satisfactorily, it has been discovered that individuals using the device have some difficulty installing the devices in the ends of the tubular components. In addition, the protrusion of the stakes above the surface of the tubular components has proven to be undesirable. Therefore, it is an object of the present invention to provide an improved clamp that is easier to insert into the end of a tubular component, yet constructed to provide a connection that is as strong and secure as the embodiments disclosed in my said patent.

In accordance with the Present invention there is provided a clamp for interconnecting the ends of hollow components, including, two stiff elements that are shaped in correspondence to opposed portions of the inner wall surfaces of the components to be connected; elastic means interposed between said elements to cause resilient separation therebetween; connecting means for engaging the components to be connected to secure against separation; and means for assuring a rigid arrangement of maximum separation between the two said elements after installation inside the abutting components; characterized in that said connecting means comprise truncated right circular cylindrical pegs each with an inclined upper surface inclined toward the adjacent end of said element to facilitate insertion of the clamp into the end of the tubular component while maintaining the clamp capability of resisting axial separation.

By truncating the pegs with the inclination of the peg top facing the adjacent end of the element, insertion of the element into a tubular component is facilitated while upon entry of the peg into a hole in the wall of the tubular component, axial separation is prevented. While the devices disclosed in said issued patent contained pegs on both elements, it has been discovered that the clamp is just as effective with pegs only on one of the elements. Of course, eliminating pegs from one element releases said one element, in the absence of some alternative restraint, such that it can slide longitudinally relative to the tubular component. However, by using a screw with a conical tip and providing a receiving cavity in the other element, the two elements are locked together against relative longitudinal movement and all parts of the clamp are prevented from separating axially from the components being joined.

BRIEF DESCRIPTION OF THE DRAWINGS

The invention will be better understood after reading the following detailed description of the presently preferred embodiments with reference to the appended drawings in which:

FIG. 1 is a side elevational view with portions broken away of a clamp embodying the invention;

FIG. 2 is an end view as seen from the line II—II in FIG. 1;

FIG. 3, is a sectional view taken along line III—III in FIG. 1; and

FIG. 4 is top plan view with portions broken away of an assembly of tubular components and the clamp of FIGS. 1–3.

The same reference numerals are used throughout the drawings to designate the same or similar parts.

DETAILED DESCRIPTION OF THE PRESENTLY PREFERRED EMBODIMENT

Referring now to the drawings, there is shown in FIG. 4 two components of a structure, designated by the numerals 1 and 3, which components are to be assembled coaxially abutting each one as a continuation of the other. Each component has a tubular configuration and along the edge of the end, has a notch 7 and, at a given distance from the edge, a hole 9.

The clamp device according to the invention is made up of two stiff elements 11 and 13 longitudinally straight and with a cross section shaped as a circular segment with one base as is clearly shown in FIG. 2. One of the two elements has a couple of pegs or stakes indicated by 15 and 17, respectively, whose distance from each other is twice the distance between the hole 9 and the end of the respective tubular component 1 and 3. Each peg 15 and 17 has an upper surface, 15A and 17A, respectively, that slants toward the adjacent end of the element on which the pegs are located, namely the element 11. In other words, the pegs 15 and 17 are in the form of truncated right circular cylinders. The two elements 11 and 13 are coupled to each other through two elastic shims composed of an elastomer such as rubber or latex foam or the like; the two shims 21, shown located near the ends of the clamp more or less in the same location as the pegs 15 and 17, are preferably joined to the elements 11 and 13 by a suitable adhesive between opposite surfaces of the shim and the adjacent face of the element 11 or 13. The two elements 11 and 13, through compression and crushing of the shims 21, can be brought together sufficiently to permit insertion of the ensemble (includes stakes 15 and 17) in the inside of each end of the components 1 and 3, axially coinciding with each other. Assembly is facilitated through the action of the slanting surfaces 15A and 17A upon inserting the clamp into the tubular component 1 or 3. That is, the clamp members consisting of the elements 11, 13 and 21 can be inserted into the ends of the tubular components 1 and 3 up to the point where the ends of the tubular components 1 and 3 approach contiguity. Thereupon, the pegs 15 and 17 will find their seats within the corresponding hole 9 of the components 1 and 3. The elements 11 and 13 of the clamp device are now free to separate under the urging of the elastic shims 21 causing the pegs 15 and 17 to engage within the corresponding hole 9. The height of the pegs 15 and 17 can be so restricted as not to protrude beyond the radially outer surface of the components 1 and 3. Nevertheless, the pegs 15 and 17 will engage the wall of the tubular component 1 or 3 due to the thickness of the wall material around the corresponding hole 9.

The two notches 7 of the abutting tubular components 1 and 3 align with each other providing an access opening through which to manipulate a screw 23, that is engaged in a through threaded hole produced centrally in the element 11. The screw 23 has a conical inside end 23A. This end of the screw 23 corresponds substantially to a complemental seat 25 formed on the internal surface of the element 13. When the screw 23 is withdrawn from the element 13, compression of the shims 21 and insertion of the clamp within the tubular components is permitted. After the insertion of the clamp within the abutting ends of the tubular components 1 and 3, the screw 23 can be manipulated through the opening formed by the notches 7 to be driven against the element 13 causing a forced separation between the two elements 11 and 13 and then a rigid engagement of the elements 11 and 13 against the internal wall surfaces of the components 1 and 3. The two components 11 and 13 are positioned relative to each other by cooperation of the screw end 23A and the seat 25. In this fashion it is possible to effect a rigid connection, even without the intervention of the elastic action of the shims 21 which assists during assembly of the clamp within the tubular components.

As shown in the drawings, the ends of the two elements 11 and 13 are chamfered so as to facilitate insertion of the clamp elements into the corresponding components 1 and 3.

By means of the described clamp a practical stable joint is achieved which is Particularly simple and avoids Projections and the like with regard to the components that it connects. Hence, a substantially aesthetic continuity is assured between the various coupled elements.

Using an elastic shim that is provided with adhesive on both faces provides for a fairly simple and economical assembly procedure.

Having described the present invention with reference to the presently preferred embodiment thereof it should be understood that various changes in construction will occur to those skilled in the art without departing from the true spirit of the invention as defined in the appended claim.

What is claimed is:

1. A clamp for interconnecting the ends of hollow tubular components having inner walls of cylindrical shape, said clamp including:
   two stiff elements in opposed cooperable relationship whose external shape is substantially cylindrical and conforms substantially to the cylindrical inner wall shape of each of said tubular components to be connected in end-to-end abutting relationship,
      the ends of said elements being chamfered to facilitate insertion of said clamp into the tubular components to be connected,
   resilient elastomeric means in the form of a pair of shims interposed between said stiff elements and adhesively bonded thereto to enable resilient lateral movement of one element relative to the other when inserted into opposed ends of said tubular components,
      each of said shims being located adjacent each end of said opposed stiff elements,
   connecting means located on the surface of at least one of said elements adjacent each end thereof for engaging corresponding connecting means located in the wall of each of said tubular components to secure the tubular components in abutting relationship and against axial separation,
      said connecting means on the surface of said element being formed of a truncated cylindrical peg with its upper surface inclined toward the adjacent end of said element to facilitate insertion of said clamp into each end of said tubular components while maintaining resistance of said abuttng tubular components against axial movement,
   means for effecting rigid arrangement of substantially maximum separation between said resiliently connected elements after insertion thereof into the ends of said tubular components,
      said means including a threaded hole passing through the wall of one of said stiff elements at substantially the abutting positions of said tubular components and a screw with a conical head for said threaded hole,
   and a conically shaped seat in the wall of the other of said opposed resiliently connected stiff elements for receiving the conical head of said screw to thereby urge said resiliently connected stiff elements apart within the abutting tubular components and thus maintain the clamp capability of resisting axial separation of said abutting tubular components.

* * * * *